United States Patent [11] 3,622,525

| [72] | Inventor | Gerald W. Miller<br>Pittsburgh, Pa. |
|---|---|---|
| [21] | Appl. No. | 611,815 |
| [22] | Filed | Jan. 26, 1967 |
| [45] | Patented | Nov. 23, 1971 |
| [73] | Assignee | Mobay Chemical Company<br>Pittsburgh, Pa.<br>Continuation-in-part of application Ser. No. 584,645, Oct. 6, 1966, now Patent No. 3,489,696. This application Jan. 26, 1967, Ser. No. 611,815 |

[54] POLYIMIDES AND POLYIMIDE PRECURSORS
9 Claims, No Drawings

[52] U.S. Cl. .................................................... 260/2.5 R,
260/2.5 AM, 260/47 EA, 260/47 EN, 260/75 R,
260/77.5 R, 260/77.5 AA, 260/78 TF, 260/346.3,
260/453 A, 260/453 P, 260/516, 260/518 R,
260/558 S, 260/607 A, 260/858, 260/860,
260/889

[51] Int. Cl. ........................................................ C08g 22/44,
C08g 22/00

[50] Field of Search .............................................. 260/2.5
AM, 78 TF, 77.5 AM, 77.5, 558 R, 558 S, 453 P,
518 R, 2.5 R

[56] References Cited
UNITED STATES PATENTS

| 3,190,770 | 6/1965 | Lavin et al. | 117/218 |
|---|---|---|---|
| 3,300,420 | 1/1967 | Frey | 260/2.5 |
| 3,314,923 | 4/1967 | Muller et al. | 260/78 |
| 3,316,211 | 4/1967 | Angelo | 260/47 |
| 3,345,333 | 10/1967 | Angelo | 260/47 |
| 3,326,851 | 6/1967 | Tocker | 260/47 |
| 3,448,150 | 6/1969 | Farrissey et al. | 260/559 |

FOREIGN PATENTS

| 674,252 | 4/1966 | Belgium | 260/2.5 |
|---|---|---|---|

Primary Examiner—Donald E. Czaja
Assistant Examiner—M. J. Welsh
Attorneys—Clelle W. Upchurch and Sylvia Gosztonyl ABSTRACT: Compounds of the class of diaryl sulfones having at least one pair of vicinal carboxylic acid groups on at least one of the aryl groups are reacted with isocyanate to prepare imides and polyimides.

POLYIMIDES AND POLYIMIDE PRECURSORS

This invention relates to a method for the preparation of polyimides and to new and unique acids and anhydrides from which the polyimides may be prepared, and is a continuation-in-part of copending application Ser. No. 584,645, now U.S. Pat. No. 3,489,696. Polyimides have recently become of considerable importance because of their outstanding resistance to high temperatures. Further, other polymeric materials heretofore unsuitable in certain applications requiring properties such as stability to high temperatures have been known to have suitable properties if a sufficient number of imide linkages are incorporated into the molecule, and the same holds true in the case of polyblends.

Currently, pyromellitic dianhydrides, cyclopentane dianhydrides and benzophenone dianhydrides are commonly used to prepare polyimides by various routes. Although the polyimides prepared from such precursors are desirable for their physical and chemical properties in many polymerization reactions, they are generally difficult and costly to prepare.

Commercially, prior art processes for the production of polyimides are severely disadvantageous in production due to the greater expense of the initial reactants or the expense of carrying out the reaction in highly specialized equipment under severly controlled conditions. Currently, the generally employed and readily obtainable materials used in the preparation of polyimides are quite expensive. Hence, although polyimides may be prepared which impart desirable properties to the final product in which they are employed, their use is discouraged by the economic aspects of their fabrication and procurement. In addition, the physical and chemical properties of polyimides prepared by conventional condensation reactions have been disclosed by Sroog in an article in the Journal of Polymer Science, Part A, Volume 3, pages 1373 to 1390 (1965) entitled "Aromatic Polypyromellitimides From Aromatic Polyamic Acids" to be variable only according to the amine used in the condensation reaction from which the polyimide is prepared. For example, polyimides are prepared generally by the direct condensation of diamines with aromatic tetracarboxylic acid dianhydrides according to the equation:

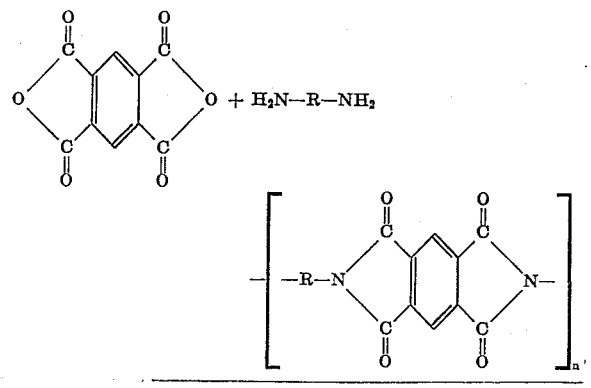

Hence, according to the propounded theory, the final properties of the polymer may be varied by changing the constituent which makes up the radical R in the foregoing equation. Such limitations on the variability of the properties of the polyimide to be prepared are highly restrictive of the types of reactants which may be used in their preparation and the ultimate application to which such products may be put. It is therefore highly desirable to provide an acid and/or anhydride for the preparation of a polyimide which is capable of varying the properties of the final polymer in its own right instead of or in addition to the degree of variability to be obtained by using diverse amines or other reactants in their preparation.

It is therefore an object of this invention to provide a method for the preparation of imides which is devoid of the foregoing disadvantages.

It is a further object of this invention to provide as new composition of matter, acids and anhydrides containing sulfonyl groups.

A still further object of this invention is to provide unique reactants from which polyimides of superior properties may be prepared economically.

Still another object of this invention is to provide reactants for the preparation of polyimides which will permit the properties of the polyimide to be varied significantly without the necessity of using a diamine to do so.

Yet another object of the invention is to provide novel anhydrides which are suitable for use as curing agents for epoxide resins or monomers such as bisphenol A diglycidyl ether or its polymeric resin.

Still further, it is an object of this invention to provide unique anhydrides suitable for use in the preparation of polyester.

A further object of the invention is to provide a reaction for the preparation of imides, prepolymers, copolymers and polyblends containing imide linkages which requires no precautions and which is rapid, efficient and self-initiating upon mixing the reactants.

Yet another object of this invention is to provide compositions useful in the manufacture of foams, lacquers, films, foils and elastomers which have very good heat stability and physical properties such as, for example, high tensile strengths.

The foregoing objects and others which will become apparent from the following description are accomplished in accordance with this invention, generally speaking, by providing new and unique sulfonyl acids and sulfonyl acid anhydrides and by providing a process in which the unique sulfonyl acids and sulfonyl acid anhydrides may be used to prepare imides having properties which are capable of being varied according to the sulfonyl acid and/or sulfonyl acid anhydride being used in its preparation. More specifically, the unique compositions of this invention are diaryl sulfonyl acids having at least one pair of vicinal carboxylic acid groups attached to at least one of the aryl radicals and the anhydrides of those acids, and the process for the preparation of the imide comprises reacting the sulfonyl carboxylic acid having at least one pair of vicinal carboxylic acid groups with an organic polyisocyanate.

The new and novel acids of this invention may be synthesized by any suitable method but they are preferably obtained according to the reaction represented by the following equations in which o-xylene is reacted with chlorosulfonic acid by way of illustration:

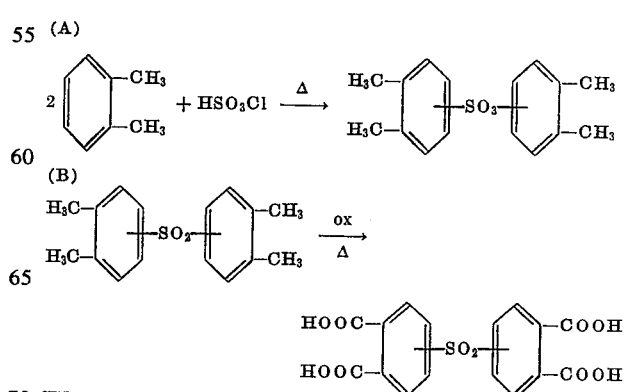

The new and novel anhydrides of this invention may be prepared by any suitable method but preferably by the following two routes in which the reactants used are merely illustrative:

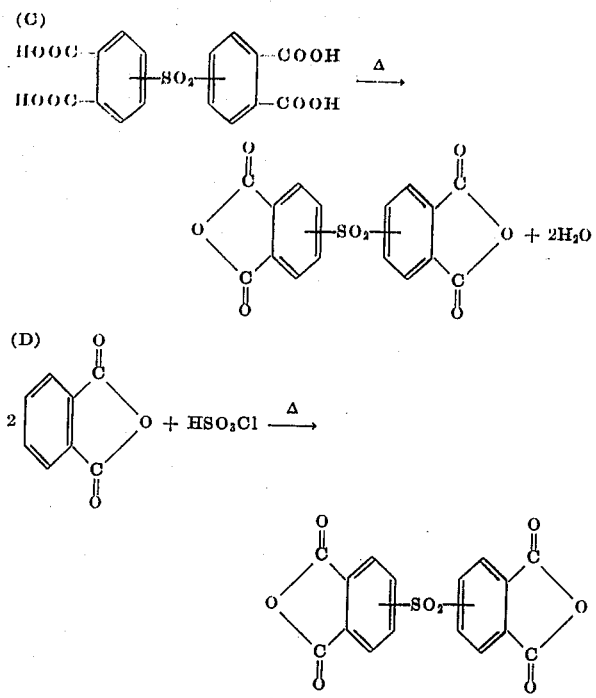

Imides may be prepared from the unique anhydrides of this invention or from the unique tetracarboxylic acids of this invention by any suitable method including the reaction of the tetracarboxylic acid anhydrides with amines, particularly dianhydrides with diamines, or the reaction of a polyamine, an aminocarboxylic acid or an amino alcohol with a carboxylic acid containing at least one cyclic anhydride group, or the reaction of an isocyanate with a compound containing a cyclic anhydride grouping which reacts with the isocyanato group to split off carbon dioxide. However, in accordance with this invention, the imide is prepared by reacting a polycarboxylic acid having at least one pair of vicinal carboxylic acid groups with an organic polyisocyanate. When an anhydride is used to prepare the imide it is first hydrolyzed to the corresponding acid.

In the preparation of the unique acids and anhydrides of this invention, any suitable reactant containing constituents which are capable of being oxidized to carboxylic acid groups may be employed. For example, in equation A set forth herein, instead of o-xylene one may also suitably employ any benzene radical containing a substituent or substituents capable of being oxidized to yield at least one pair of vicinal carboxylic acid groups. Hence, the benzene radical may contain vicinal side chains of any desired aliphatic radical having any desired chain length and each aliphatic side chain may be the same as or different from the aliphatic side chain in the vicinal position to it. In such cases the aliphatic side chains are oxidized to the terminal carbon atom in the oxidation reaction illustrated in equation B and a vicinal dicarboxylic acid may thus be readily prepared for each such compound used in the preparation of the unique acids and anhydrides of this invention. Examples of some such suitable compounds which may be used to prepare the unique acids and anhydrides of this invention are o-diethylbenzene, o-dipropylbenzene, o-dipentylbenzene, o-diheptylbenzene, methyl-o-decylbenzene, decyl-o-laurylbenzene, o-dieicosanylbenzene, 1,2,4,5-tetramethylbenzene, 1,2,5-trimethylbenzene, 1-methyl-2-decyl-4-laurylbenzene, 1-pentyl-2-decyl-4-pentadecyl-5-laurylbenzene, 1,2,3-trimethylbenzene and the like and mixtures thereof.

Any suitable polycyclic compound such as, for example, naphthalene, fluoranthrene, benzanthracene, anthracene, pentacene, hexacene, pyranthrene, fluorene, indene, chrysene, phenanthrene and the like may also be used to prepare the unique acids and anhydrides of this invention. When the unsubstituted polycyclic compounds are used to prepare the unique acids and anhydrides of this invention, the sulfonyl group deactivates the rings to which it attaches by any other rings remain vulnerable to oxidation conditions and oxidize to yield the diacid according to equation B. However, the polycyclic reactants may also contain substituents which are ortho to one another such as, for example, aliphatic side chains containing any desired number of carbon atoms. In such a case the oxidation conditions can be adjusted so that the reaction product is the acid of the polycyclic compound itself. The oxidation reaction conditions can be adjusted to suit either type of initial reactant by merely choosing the appropriate oxidizing agent and/or conditions in either case. For example, in order to oxidize a ring such as, for example, a naphthyl or anthryl or the like ring to the corresponding benzyl carboxylic or naphthyl carboxylic acid or the like or mixtures thereof, it is preferable to use strong oxidizing conditions such as air plus vanadium pentoxide, air plus osmium tetroxide and the like. In order to simply oxidize an aliphatic side chain, any suitable chemical oxidizing agent may be used such as, for example, nitric acid, potassium permanganate, the chromates and dichromates and the like. Where the compound to be oxidized is a monocyclic compound with aliphatic side chains, either type of oxidizing agent may preferably be used. It is to be understood, however, that any suitable oxidizing conditions may be employed which will oxidize the initial reactant in accordance with this invention and that any such suitable method may be used and the methods may be interchanged as desired.

Some aliphatic substituted polycyclic compounds which may be oxidized to yield the acid of the polycyclic compound itself are, for example, 2,3-dimethyl naphthalene, 1,2-dimethyl naphthalene, 2-methyl-3-decyl naphthalene, 7,8-dipropyl naphthalene, 1-decyl-2-lauryl naphthalene, 2,3-dimethyl anthracene, 2,3,6,7-tetramethyl naphthalene, 2-methyl-3-ethyl-6-heptyl-7-decyl naphthalene, 3,4,5-trimethyl naphthalene, 1,2,3,4-tetramethyl anthracene, 1,2,3,4-tetramethyl naphthalene, 1,2,5,6-tetrapentyl anthracene, 1-propyl-2-hexyl-6-pentyl-7-octyl anthracene, 1,2,5,6,7,8-hexamethyl anthracene, 1,2,3,4,5,6,7,8-octamethyl anthracene, 1,2-dieicosanyl-5,6-dilauryl anthracene, 2,3,10,11-tetramethyl hexacene, 1,2-dimethyl hexacene, 1-methyl-2-ethyl-3-propyl-4-butyl hexacene, 1,2,-dimethyl hexacene, 2-pentyl-3-decyl-10-Lauryl-11-eicosanyl hexacene, 1,2-dimethyl phenanthrene, 1,2,9,10-tetraethyl phenanthrene, 5-butyl-6-decyl phenanthrene, 1,2,3-tripentyl phenanthrene, 1-methyl-2-propyl-6-hexyl-7-lauryl phenanthrene, 9,10-dimethyl pentacene, 2,3,9,10-tetraethyl pentacene, 1-methyl-2-ethyl-3-propyl-9-lauryl-10-eiconsanyl pentacene. 2,3-dimethyl fluorene, 1-ethyl-2-pentyl fluorene, 1,2,3,4,5,6,7,8,-octomethyl fluorene, 5,6,7-tripropyl fluorene, 5-propyl-6-hexyl-7-octyl fluorene, 2,3,-dieicosanyl fluorene, 2,3,-dimethyl fluoranthrene, 2,3,5-tripropyl fluoranthrene, 7-butyl-8-octyl fluoranthrene, 1-methyl-2-ethyl-3-butyl-5-pentyl-7-octyl-8-hexyl-9-decyl-11-lauryl fluoranthrene, 3,4-dimethyl benzanthracene, 1,2,3-tripropyl benzanthracene, 3-methyl-4-propyl-5-hexyl-6-heptyl-7-octyl-8-decyl-9-butyl benzanthracene, 1,2,3,4,5,6,7,8,9,10,11,12-dodecamethyl benzanthracene, 1,2-dimethyl pyranthrene, 2,3,4-triethyl pyranthrene, 6-propyl-7-butyl-9-pentyl-10-hexyl pyranthrene, 1,2,3,4,5,6,7,8,9,10,11,12,13,,14,15,16-hexadecapropyl pyranthrene, 1,2-dimethyl chrysene, 2,3-dipentyl chrysene, 1,2,3-triethyl chrysene, 2,3,8,9-tetrapropyl chrysene, 1-methyl-2-ethyl-3-butyl-4-hexyl-5-octyl-6-decyl chrysene, 1,2,3,4,5,6,7,8,9,10,11,12dodecabutyl chrysene, 1,2-dimethyl indene, 1,2,3-tributyl indene, 2,3,5,6-tetrapentyl indene, 1-ethyl-2-methyl-3-propyl-4-pentyl-5-decyl-6-heptyl-7-hexyl indene and the like and the various isomers and mixtures thereof. It is to be understood that the foregoing listing is merely illustrative and that any suitable polycyclic compound may be used in the practice of this invention wherever polycyclic compounds are referred to herein and that all such polycyclic compounds are contemplated.

In addition, any suitable polyaryl compound containing aliphatic side chains in the ortho position to one another may be used to prepare the unique acids and anhydrides of this invention. For example, compounds such as terphenyl, quaterphenyl, diphenyl, dinapthalene, dihexacene, bianthracene, biphenanthrene and the corresponding biaryl form of any of the polycyclic compounds suggested herein which may be prepared as desired and the like having aliphatic side chains in any desired position may be used with the proviso that at least two of the aliphatic side chains are ortho to one another in the molecular structure. For example, some such suitable compounds are 2,3-dimethyl biphenyl, 2-pentyl-3-ethyl biphenyl, 3-lauryl-4-butyl biphenyl, 2,3,4-trimethyl biphenyl, 2,3,4'-tributyl biphenyl, 2,3,5',6'-tetramethyl biphenyl, 2-methyl-3-ethyl-5'-propyl-6'-butyl biphenyl, 3,4,3',4'5,6,2',3'-tetramethyl biphenyl, 4'-decyl-5'-lauryl-6'-methyl-m-terphenyl, 2,3-dimethyl-p-terphenyl, 2,3,5-trimethyl-m-terphenyl, 2-methyl-3-eicosanyl-m-terphenyl, 2,3,2',3', 2'',3'' -hexamethyl-p-terphenyl, 2,3,2'',3''-tetramethyl-m-terphenyl, 3,4,5',6', 4''',5''-hexaethyl-p-terphenyl, 5-methyl-6-ethyl-2',3'-dipropyl-5''-butyl-6''-pentyl-p-terphenyl, 4,5-dilauryl-3'',4''-dieicosanyl-p-terphenyl, 2,3,2',3'-tetramethyl-1,1'-binaphthalene, 2,3-dimethyl-1,1'-binaphthalene, 2-pentyl-3-decyl-1,1'-binaphthalene, 2-butyl-3-pentyl-1-hexyl-1,1'-binaphthalene, 3,4-dimethyl-4'-ethyl-1,2-binaphthalene, 6-methyl-7-ethyl-6'-propyl-7'-butyl-1,1'-binaphthalene, 5-lauryl-6-dodecyl-5'-eicosanyl-6'-pentadecyl-1,1'-binaphthalene, 3,4,6',7'-tetradecyl-1,2'-binaphthalene, 2,3-dimethyl-p-quaterphenyl,2,3-dibutyl-p-quaterphenyl, 4-methyl-5-lauryl-p-quaterphenyl, 4,5,2-trimethyl-p-quaterphenyl, 2,3,3',4',5'',6'',5α''',6''''-octamethyl-1,1':2',1''':4'',1'A:-quaterphenyl, 5-methyl-6-ethyl-4'-propyl-5'-butyl-2''-pentyl-3''-hexyl-3'''-heptyl-4'''-octyl-1,1':2',1':4'',1''''-quaterphenyl, the corresponding biaryl compound of any of the polycyclic compounds set forth herein and containing aliphatic side chains in the ortho position to one another and the like and the various isomers and mixtures thereof.

Polyaryl alkanes may also be used as long as each contains at least one substituent capable of being oxidized to yield at least one pair of vicinal carboxylic acid groups. Some such suitable reactants are, for example, any suitable polycyclic polyarly alkanes including polynaphthyl alkanes, polyhexacene alkanes, polypentacene alkanes, polyfluorene alkanes, polychrysene alkanes, polybenzanthracene alkanes, polyfluoranthrene alkanes, polypyranthrene alkanes, polyanthryl alkanes, polyphenanthryl alkanes, polyindene alkanes and the like and the various isomers and mixtures thereof. Some such suitable compounds are for example, 1,1'-dinaphthyl methane, 1,2'-dinaphthyl methane, 1,1'-dinaphtyl ethane, 1,2'-dinaphthyl propane-2,1,1'-dinaphthyl decane-5,1,1',1'''1,3,6,1,2',1'',2'''-tetranaphthyl dodecane-1,4,7,10, 1,1'-dinaphthyl hectane-a,w,2,2''-dianthryl methane, 1,1'-dianthryl ethane, 1,2'-dianthryl triacontane-12,1,1',1''-trianthryl dictane-1,10,20, 2,2-dephenanthryl methane, 2,2' -diphenanthryl propane-2, 2,2',2''-triphenanthryl pentacontane-1,10,30, 1,1-diindenyl methane, 2,2-diindenyl propane-2, 1,2',1''',2'''-tetraindenyl hectane-1,20,50,80, 1,1'-dihexacene propane- 2, 1,2',1'''-trihexacene pentacontane-1,10,30, 2,2',2'',2''''-tetrapentacene pentacosane-1,6,12,25, 1,1'-dipentacene methane, 1,2'dipentacene propane-2, 2,2'-depentacene dictane-a,w, 2,2'-dihexacene dictane-a,w, 1,2',3''-tripentacene triacontane-1,15,30, 2,2'-dibenzanthracene methane, 2,3'-dibenzanthracene propane-1,6,6'-dibenzanthracene pentane-1,5, 2,3',6''-tribenzanthracene triacontane-1,15,30, 3,3'-dibenzanthracene hectane-a,w, 2,3',2''',3''',2''''-tetrabenzanthracene dictane-1,30,60,100, 2,2'-difluorene methane, 1,2'-difluorene ethane-1,2, 2,2'-difluorene propane-2, 2,2'-difluorene hectane-a,w, 3,3'-difluorene hexane-1,6, 2,2'-difluoranthrene butane-1,4, 3,3',2'',2''''-tetrafluorene tetracontane-1,15,30,40, 3,3'-difluoranthrene hexane-1,6, 2,2'-difluoranthrene ethane, 2,6'-difluoranthrene decane-1,10, 2,3',6''-trifluoranthrene pentadecane-1,10,15, 2,2'-difluoranthrene hectane-a,w, 2,2'-dichrysene propane-1,3,1,1'-dichrysene heptane-1,5, 1,2',1''-trichrysene hexacosane-1,30,60, 2,2'-dichrysene ethane, 2,2'-dipyranthrene dictane-a,w, 1,3'-dipyranthrene hectane-a,w, 2,2'-dipyranthrene propane-1,3, 1,2',2''-tripyranthrene hexacontane-1,30,60 and the like and the various isomers and mixtures thereof.

Polyaryl alkanes having at least one pair of vicinal aliphatic side chains on at least one of the aryl groups may also be used. Hence, polyphenyl alkanes as well as any of the polyaryl alkanes of any of the polycyclic compounds suggested herein and the like having at least one pair of vicinal aliphatic side chains and the various isomers and mixtures thereof are operable. Some such suitable compounds are, for example, 4,5-dimethyl diphenyl methane, 4-methyl-5-decyl-diphenyl propane-2, 4,5,4'-trimethyl diphenyl methane, 4,5,-dimethyl diphenyl dodecane-10, 4,5,4',5'-tetramethyl diphenyl methane, 3-methyl-4-ethyl-3'-propyl-4'-butyl-diphenyl ethane, 2,3-dimethyl-5,6-diethyl-2',3'-dipropyl-5',6'-dibutyl diphenyl propane-2, 6,7,6',7'-tetramethyl-1,1'-dinaphthyl methane, 2,3,2',3'-dinaphthyl dodecane-10, 3,4-dimethyl dinaphthyl methane, 2,3,4-triethyl dinaphthyl propane-2, 2-propyl-3-butyl-6-pentyl dinaphthyl pentane-3, 3,4,5,6,3',4',5' ,6'-octabutyl dinaphthyl ethane, 2-methyl-3-propyl-2'-butyl-3'-pentyl-dinaphthyl propane-2, 3-methyl-4-ethyl-6-propyl-7-butyl-3'-pentyl-4'-hexyl-6'-heptyl-7'-octyl-dinaphthyl propane-2, 3,4-dimethyl dianthryl methane, 3-butyl-4-decyl dianthryl butane-1, 2-methyl-3-hexyl-7-methyl dianthryl hexane-3, 5,6,5',6'-tetramethyl diphenanthryl methane, 5,6,5',6'-tetrabutyl-dianthryl methane, 5-pentyl-6-hexyl-5'-heptyl-6'-octyl-dianthryl propane-2, 3,4-dimethyl-1,1',1'''-trinaphthyl hexane-1,3,6, 3,4,5-triethyl-1,1',1''-trinaphthyl hexane-1,3,6, 3,4,3',4'-tetramethyl-1,1',1'''-trinaphthyl decane-1,5,10, 3-propyl-3'-methyl-4'-pentyl-3'''-decyl-1,1',1''-trinaphthyl pentadecane-1,10,15, 3,4-dimethyl-1,2',1''',2''''-tetranaphthyl tetracontane-1,10,20,30 3,4,5-triethyl-1,1',1'',1'''-tetranaphthyl tetracontane- 1,10,20,30, 3-propyl-3'-methyl-4'-pentyl-3''-decyl-4''-dodecyl-3'''-methyl-1,1',1''',1''''-tetranaphthyl tetracontane-1,10,20,30, 3,4-dimethyl-1,2',1'',2'''-tetranaphthyl dodecane-1,4,9,12, 3,4-dimethyl-1,1',1''-trianthryl-dictane-1,10,20, 2-methyl-3-ethyl-2'-propyl-3'-heptyl-1,1',1''-trianthryl dictane-1,10,20, 3-methyl-3'-octyl-4'-nonyl-3''-methyl-1,2',1'''-trianthryl eicosane-1,10,20, 5,6-dimethyl-2,1',2''-triphenanthryl pentacontane-1,10,30, 5-decyl-5',6'-didecyl-5''-decyl-2,2',2''-triphenanthryl pentacontane-1,10,30, 5,6-dimethyl-5',6'-diethyl-5'',6''-dipropyl-1,1',1''-triphenanthryl tricosane-7,14,23, 5,6-dimethyl-2,2'-diindenyl methane, 2,3,4',5'-tetraethyl-1,2'-diindenyl propane-1,3, 2,3-dimethyl-1,1',1''''-triindenyl hectane-1,20,50, 3-decyl-2',3'-dipropyl-5'',6''-dioctyl-2,1',2''-triindenyl dodecane-1,6,12, 2,3-dimethyl-3'-ethyl-4''-butyl-4''',5'''-dimethyl-1,2',2''',1''''-tetraindenyl hectane-1,20,50,80,2,3-dimethyl-1,1' -dihexacene pentane-1,5, 10,11-dimethyl-2,2',2''-trihexacene dodecane-1,6,12, 10-decyl-10',11'-dipropyl-10''-octyl-1,2',1'''-trihexacene eicosane-1,10,20, 2,3,10,11-tetramethyl-2',3',1',11''-tetraethyl-2''',3''', 1'',11''-tetrapentyl-2''',3''',10''',11''''-tetrapropyl-1,1';1'',1' ''-tetrahexacene tetracontane-1,10,20,30, 4,5-dimethyl-tetraphenyl methane, 3,4-dipropyltriphenyl methane, 2,3,4,5,6,7,8,2',3',4',5',6',7',8',2'',3'',4'',5'',6'',7'',8''-heneicosamethyl-1,1',1''-trinaphthyl dodecane-1,6,12, 2,3,2',3', 2'',3''',2''',3''''-octamethyl tetraphenyl octane-2,4,6,8, 2,3-dioctyl tetraphenyl methane, 3,4-didecyl tetraphenyl tetracontane-10,20,30,40, hecta-(2,4-dimethylphenyl)-dictane wherein there is one phenyl group for every other methyl group in the dictane molecule beginning with the first carbon atom, 7,8-dimethyl-2,2'-dichrysene methane, 3-methyl-4- ethyl-5'-butyl-6'-hexyl-7''-octyl-8''-nonyl-2,1',2''-trichrysene triacontane-1,15,30, 1,3,4-trimethyl-2,2',2''-trichrysene hexadecane-1,10,16, 5,6-dipropyl-2,2'-difluoranthrene propane-1,3, 4,5-dimethyl-2',3'-dipropyl-9'',10''-diethyl-2,6',7''-trifluoranthrene triacontane-1,15,30, 2,3',6'',2'''-tetra-(7,8-dimethyl fluoranthrene)tetracontane- 1,10,20,30, 9,10-dimethyl-2,2'-dibenzanthracene propane-1,2, 5-methyl-6-ethyl-7-lauryl-5'-methyl-6'-ethyl-7'-lauryl-5''-methyl-6''-ethyl-7'''-lauryl-2,3',4''-tribenzanthracene dodecane-1,6,12, 2,3-dimethyl-1,1'-difluorene propane-1,3, 2,3,4-tripropyl-1,2'-difluorene pentane-1,5, 2,3-dimethyl-2',3'-dipropyl-4''-hexyl-1,2',3''-trifluorene octacosane-1,20,28, 2,1',3'',4'''-tetra-(6,7-diethylfluorene)-pentacontane-1,10,20,40, 9,10-diethyl-2,2'-dipentacene propane-1,3, 2,3,4-trimethyl-1,2'-dipentacene pentane-1,5, 3,4,4'-tripropyl-1,2'-dipentacene decane-1,10, 8,9-dimethyl-10,11-dipropyl-2'-ethyl-3'-pentyl-3'',4''-dihexyl-2,1',1''-tripentacene hexacontane-1,30,60, 2,2',2'',2'''-tetra(9,10-dipropyl pentacene) tritriacontane-1,10,20,33, 3,4-dimethyl-2,2'-dipyranthrene propane-1,3, 6,7,8-triethyl-3,3'-dipyranthrene hexane- 1,6,10,11,10',11',14'',15''-trihexyl-2,3',10''-tripyranthrene eicosane-1,10,20, 1,2',3'',4'''-tetra(14,15-dimethyl pyranthrene) hentriacontane-1,10,20,31 and the like and the various isomers and mixtures thereof.

Whenever the unsubstituted polycyclic compounds are used, the ring to which the sulfonyl group is attached is deactivated but the outer rings are vulnerable to attack under oxidizing conditions and are converted to the diacid of the deactivated nucleus under oxidation conditions. Where vicinal aliphatic side chains are contained in the molecule, the side chains may be oxidized to yield the vicinal carboxylic acid groups and any number of carbon atoms may be contained in the side chain since, in any event, the side chain is oxidized to the terminal carbon atom which is converted into a carboxyl grouping.

Further, if it should be so desired, the acids and anhydrides of this invention may be prepared from one compound containing a group or groupings capable of being oxidized to yield vicinal carboxylic acid groups and another reactant which contains no grouping capable of being oxidized to yield vicinal carboxylic acid groups. In such a case, the product obtained will contain only the functionality of the compound containing a grouping or groupings capable of being oxidized to yield vicinal carboxylic acid groups. For example, 1 mol of toluene and 1 mol of o-xylene may be reacted with the chlorosulfonic acid in equation A instead of 2 mols of o-xylene. The product, oxidized according to equation B, will have the functionality of two carboxylic acid groups or, in the preparation of the imides in accordance with this invention, a functionality of one. Any other suitable material may be used in admixture with o-xylene or any of the compounds described herein and similar compounds in the preparation of the unique acids and anhydrides of this invention. For example, some such suitable compounds may have the formula ArZ, wherein Z is hydrogen or any suitable aliphatic radical having any desired number of carbon atoms and Ar is any suitable aryl radical such as, for example, benzene, naphthalene, anthracene, pentacene, fluoranthrene, hexacene, phenanthrene, chrysene, benzanthracene, pyranthrene, terphenyl, quaterphenyl, indene, fluorene, any suitable biaryl form of any of the foregoing and similar compounds such as biphenyl, binaphthyl and so on and the like. Some such suitable compounds are, for example, benzene, toluene, 2-ethyl benzene, 4-propyl benzene, 3-dodecyl benzene, cumene, p-xylene, napthalene, 3-methyl naphthalene, 5-ethyl naphthalene, 6-eicosanyl naphthalene, 2-methyl anthracene, 4-methyl anthracene, 7-ethyl anthracene, 8-pentadecyl anthracene, 6-ethyl hexacene, 2-hectyl hexacene, 3-methyl indene, 2-eicosanyl indene, 2,4-dimethyl benzene, 2-propyl-5-hexadecyl benzene, 2,5,7-trimethyl naphthalene, 2-ethyl-6-dodecyl naphthalene, 3,6,9-trimethyl anthracene, 2-ethyl-4-decyl-9-octyl anthracene, 2,4,6,8,10-hexamethyl hexacene, 2-methyl-5-decyl hexacene, 1,3,5-trimethyl benzene, 2,5-dimethyl indene, 2-ethyl-3-propyl-4-butyl-7-methyl indene, 2,4,6-tributyl indene, 2-methyl phenanthrene, 2,7-diethyl phenanthrene, 1-propyl-4-pentyl-5-octyl-7-butyl-9-methyl phenanthrene, 2-methyl benzanthracene, 3,5,9-tripropyl benzanthracene, 3-pentyl-5-ethyl-7-lauryl-9-methyl-11-butyl-12-methyl benzanthracene, 2-ethyl pentacene, 2,10-dipropyl pentacene, 2,4,6-tributyl pentacene, 1-methyl-3-ethyl-5-butyl-6,7,8-tripropyl pentacene, 3-methyl fluorene, 2,4-diethyl fluorene, 3,5,7-tributyl fluorene, 2-methyl-4-butyl-6-hexyl-7-octyl-10-decyl fluorene, 3,5,7-tributyl fluorene, 2-methyl-4-butyl-6-hexyl-7-octyl-10-decyl fluoranthrene, 2,4-diethyl fluoranthrene, 2,4,6-tributyl fluoranthrene, 2-ethyl chrysene, 1,3-dipropyl chrysene, 4,5,7,8,9,12,15,16-octomethyl pyranthrene, 1-ethyl-4-butyl-5-pentyl-7-hexyl-10-octyl-12-methyl chrysene, 1-methyl pyranthrene, 2,4-dipropyl pyranthrene, 1,3,5,7,10,12-hexamethyl chrysene, 2-propyl-4-ethyl-5-butyl-7-heptyl-9-decyl-12-methyl chrysene and the like and various isomers and mixtures thereof as well as the biaryl forms of any of the foregoing compounds and their isomers and mixtures thereof; further, any of the unsubstituted polycyclic radicals, their isomers and mixtures thereof as discussed herein may also be used under oxidation conditions which do not cleave any of the cyclic structures of the molecule. It is to be understood that the only limitation on the compounds described is that they are not capable of being oxidized to yield vicinal carboxylic acid groups. Hence, these compounds may also be substituted with radicals which are not sensitive to oxidation conditions. Some such suitable substituents which may be present in the molecule are, for example, halogen atoms such as fluorine, chlorine, iodine, bromine and the like, nitro groupings, sulfonic acid radicals and the like and any desired mixture thereof.

Any suitable reactant capable of contributing a sulfonyl atom in the reaction of equation A may be used instead of or in admixture with the chlorosulfonic acid set forth by way of illustration therein. Some such suitable reactants are, for example, sulfuric acid, fuming sulfuric acid, or oleum, sulfur trioxide, sulfuryl chloride, polymeric sulfur trioxide, and the like and mixtures of sulfuric acid, chlorosulfonic acid, sulfur trioxide, sulfuryl chloride, polymeric sulfur trioxide and oleum and the like. Hence, any suitable sulfonating agent may be used in order to carry out reaction A.

Any suitable oxidizing agent and any suitable oxidizing conditions may be used in order to convert the products of reaction A into the corresponding carboxylic acid. For example, the reaction product of equation A may be heated in the presence of nitric acid, it may be treat with potassium permanganate and an alkali such as NaOH, or with sodium dichromate and sulfuric acid or it may be subject to any other suitable oxidizing agent and oxidizing reaction conditions desired in order to convert the product of reaction A into the corresponding carboxylic acid.

The unique sulfonyl acids which are prepared in accordance with this invention fall generally within the scope of the formula:

$$(HOOC)_m Ar-SO_2-Ar(COOH)_n$$

in which Ar is an aromatic radical, $m$ is an integer of from about 0 to 100, $n$ is an integer of from about 2 to 100 and wherein at least two of the COOH groups are vicinal to one another. More specifically, Ar can be the same or different benzyl, naphthyl, benzanthryl, chrysene, pyranthrene, pentacene, anthryl, phenanthryl, indene, fluorene, and the like, the corresponding biaryl form of these and similar compounds, polyaryl alkanes and the like radicals. Some specific examples of some such acids include bis-(3,4-dicarboxybenzene)sulfone, bis(2,3-dicarboxyphenyl)sulfone, bis(3,4-dicarboxyphenyl)sulfone, (3,4-dicarboxyphenyl-4'-carboxyphenyl) sulfone, (3,4-dicarboxyphenyl-2'-carboxyphenyl)sulfone, bis(2,3,5,6-tetracarboxyphenyl)-sulfone, bis(2,4,6-tricarboxyphenyl)sulfone, bis(3,4-dicarboxynaphthyl)-sulfone, bis(7,8-dicarboxynaphthyl)sulfone, bis(6,7-dicarboxynaphthyl)-sulfone, bis(5,6-dicarboxynaphthyl)sulfone, (2,3-dicarboxynaphthyl-5',6',7'-tricarboxynaphthyl)sulfone, bis(2,3-dicarboxyanthryl)sulfone, bis(8,9-dicarboxyanthryl)sulfone, (2,3-dicarboxyanthryl-8',9'-dicarboxyanthryl)-sulfone, bis(2,3,4,5,6,7,8-heptacarboxynaphthyl)sulfone, bix(2,3,4,6,7,8,9-heptacarboxyanthryl)sulfone, bis(2,3-dicarboxyphenanthryl)sulfone, bis(5,6,7-tricarboxyphenanthryl)sulfone, (5,6,9,10-tetracarboxyphenanthryl-3',4',5'-tricarboxyphenanthryl)sulfone, bis(2,3-dicarboxyindenyl)-sulfone, bis(5,6,7-tricarboxyindenyl)sulfone, (4,5-dicarboxyindenyl-4',5', 6'-tricarboxyindenyl)sulfone, bis(2,3-dicarboxybenzanthracene)sulfone, (7,8,9-tricarboxybenzanthracene-2',3'-dicarboxybenzanthracene)sulfone, bis( 2,3,4-tricarboxypentacene)sulfone, (2,3,7,8-tetracarboxypentacene-3',4'-dicarboxypentacene)sulfone, bis(2,3-dicarboxyhexacene)sulfone, bis(3,4,9,10-tetracarboxyhexacene)sulfone, (2,3-dicarboxyhexacene-2',3',10',11'-tetracarboxyhexacene) sulfone, bis(2,3-dicarboxyfluorene) sulfone, bis(4,5,6,7-tetracarboxyfluorene) sulfone, (3,4-dicarboxyfluorene-2',3',6',7'-tebracarboxyfluorene) sulfone, bis(4,5-dicarboxyfluoranthrene) sulfone, bis(4,5,6-tricarboxyfluoranthrene) sulfone, (2,3,4,5,6-tetracarboxyfluoranthrene-7',8',9'-tricarboxyfluoranthrene)sulfone, bis(2,3-dicarboxychrysene-10',11',12'-tricarboxychrysene)sulfone, bis(2,3-dicarboxypyranthrene)sulfone, bis(2,3,9,10-tetracarboxypyranthrene)sulfone, (3,4,5,6-tetracarboxypyranthrene-9',10'-dicarboxypyranthrene)sulfone, (2,3-dicarboxyphenyl-2,3,4-tricarboxypyranthrene)sulfone, (5,6,7-tricarboxynaphthyl-7,8-dicarboxychrysene)sulfone, (5,6,7-tricarboxyanthryl-7,8,9-tricarboxyfluoranthrene)sulfone, (6,7-dicarboxyphenanthrene-5,6,7,8-tetracarboxyfluorene)sulfone, (4-carboxy indene-9,10-dicarboxyhexacene)-sulfone, (12-carboxybenzanthracene-8,9,10-tricarboxypentacene)sulfone, (9,10,11,12-tetracarboxyhexacene-2-naphthylene)sulfone, (phenyl-2,3-dicarboxyphenyl)sulfone, (naphthyl-3,4-dicarboxyphenanthryl)sulfone, (phenanthryl-5,6-dicarboxyphenyl)sulfone, (indene-8,9-dicarboxybenzanthracene)sulfone, (benzanthracene-1,2,3-tricarboxyindene)sulfone, (pentacene-8,9,10,12-tetracarboxypyranthrene)sulfone, (fluorene-9,10-dicarboxyhexacene)sulfone, (fluoranthrene-2,3,8-tricarboxychrysene)-sulfone, (chrysene-2,3-dicarboxyfluorene)sulfone, (pyranthrene-5,6,7-tricarboxyfluoranthrene)sulfone, (anthracene-2,3-dicarboxynaphthalene)-sulfone, (naphthalene-2,3-dicarboxyanthracene)sulfone, the corresponding biaryl forms of any of the foregoing, the various isomers and mixtures thereof. Further, any of the oxidation products of any of the aryl compounds, polyaryl alkanes, biaryl compounds, polycyclic compounds, aliphatic substituted aryl and polyaryl compounds and the like as described herein may be substituted for the corresponding radical in any of the foregoing examples and all such compounds are contemplated. Hence, bis(3,4,3',4'-tetracarboxybiphenyl)sulfone and bis(3,4,3', 4'-tetracarboxydiphenylmenthane)sulfone may be used as well as the bis(3,4-dicarboxyphenyl)-sulfone compound set forth herein, and in like manner, (binaphthalene-2,3,2',3'-tetracarboxybianthracene)sulfone and (dinaphthylmethane-2,3,2',3'-tetracarboxydianthrylmethane)sulfone may be used as well as the (naphthalene-2,3-dicarboxyanthracene(sulfone compound set forth herein, and so on. For the sake of illustration, some such suitable compounds are, for example, bis(3,4,3',4'-tetracarboxybiphenyl)sulfone, bis(3,4,3',4'-tetracarboxydiphenylmethane)sulfone, (3,4,3',4'-tetracarboxydiphenyl-4'-carboxy-2,2'-dinaphthylpentane-3)sulfone, (3,4-dicarboxydiphenyl-4'-carboxybinaphthyl)sulfone, (biphenyl-3,4,3',4'-tetracarboxybinaphthylene)-sulfone, (4,5,4',5'-tetracarboxybiindene-4', 5',6'-tricarboxyindene)sulfone, (3,4,3',4'-tetracarboxydiphenyl-2.2'-dianthracene)sulfone, bis(3,4,7,8-tetracarboxynaphthyl-2,3,2',3'-tetracarboxy-7,7'-diphenanthryl)sulfone, (4,4'-bibenzanthracene-3,4,3',4'-tetracarboxy-10,10'-dipentacene butane-1,4)sulfone, (11,10'-bihexacene-3,4,3',4'-tetracarboxy-difluorene decane-1,10)sulfone, (6,6'-bifluoranthrene-7,8,7',8'-tetracarboxy-dichrysene dictane-a,w)sulfone, (10,11'-dipyranthrene-a,w-hectane-4,5,4',5'-tetracarboxy-2,2'-diindene propane-1,3)sulfone (8,8'-bichrysene-3,4-dicarboxyphenyl)-sulfone, (6,7'-difluoranthrene-1,6-hexane-3,4-dicarboxynaphthalene)sulfone, (9,9'-bipyranthrene- 3,4,3',4'-tetracarboxy-5,8'bifluorene)sulfone, (3,4,3',4'9,9'-bipentacene-4,4'-bihexacene)sulfone, (10,10'-dibenzanthracene-1,10-decane-4,5,4',5'-tetracarboxy-3,3'-biindene)sulfone, (7,7'-diphenanthryl-1,3-propane-7,8,7',8'-tetracarboxy-dianthracene butane-1,4)sulfone and the like. Any other combination or isomeric form of any of the compounds and radicals described herein and mixtures thereof may be used in place of the corresponding radicals and compounds set forth above.

The conversion of the carboxylic acid containing at least one pair of vicinal carboxylic acid groups into the anhydride may be achieved by any suitable method but primarily by simply heating the carboxylic acid containing at least one pair of vicinal carboxylic acid groups as illustrated in equation C.

Another preferred route for preparing the anhydrides of this invention is set forth in equation D. In such a mode of preparation any suitable anhydride such as, for example, phthalic anhydride is reacted with any suitable sulfonating agent such as those set forth herein and heated to yield the corresponding sulfonyl anhydride. Any suitable anhydride of any desired carboxylic acid may be used either alone or in admixture with the anhydride of any other carboxylic acid and/or any other organic radical which does not necessarily contain an anhydride grouping. In the latter case, a compound containing only those carboxylic acid groups corresponding to the anhydride groups of the anhydride-containing reactant is obtained. Any of the reactants set forth hereinbefore as containing no groups capable of being oxidized to yield vicinal carboxylic acid groups may be used as the reactant which contains no anhydride grouping in the reaction represented by equation D.

The unique sulfonic acid anhydrides of this invention are those which correspond to the sulfonyl acids described herein by the removal of one molecule of water for each pair of vicinal carboxylic acid groups and all such anhydrides are contemplated.

The anhydrides and/or the corresponding carboxylic acids of this invention can be used to prepare imides, including polyimides, by any suitable method. For example, the anhydride may be reacted with diamines according to the equation:

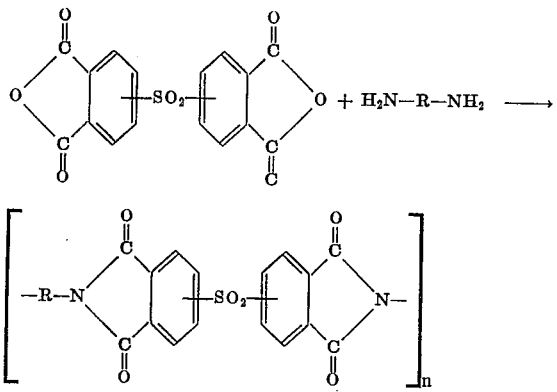

Alternatively, and in accordance with this invention, the acid or the anhydride which has been hydrolyzed to the corresponding carboxylic acid is reacted with a polyisocyanate to yield the corresponding imide according to the illustrative equation:

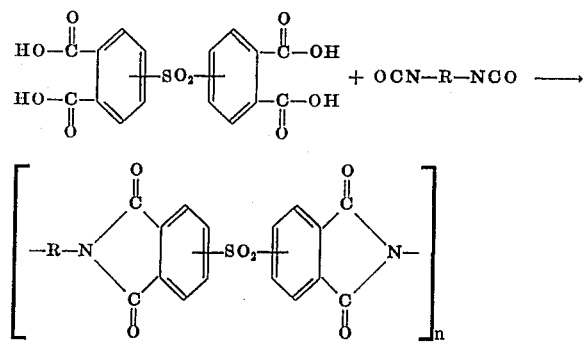

The reaction of this invention for the preparation of an imide is advantageous because the reaction between the isocyanate and a vicinal diacid is instantaneous whereas he reaction of an anhydride or a vicinal diacid and an amine, for example, is slow depending upon the temperature employed. No precautions need to be taken in order to insure a high yield of relatively pure product since the reaction begins immediately simply upon mixing the polycarboxylic acid and the isocyanate. No catalysis, elevated temperature or pressure are required in order to initiate the reaction and the final product may be attained simply by allowing the reaction mixture to stand for a period of time after the initial reaction yields the intermediate product. However, if it is so desired, the final product can be achieved almost immediately from the intermediate product or from the initial reactants with the application of heat, and preferably at temperatures of at least 100° C. This process also enables the preparation of unique prepolymeric materials containing imide groupings which may then be easily incorporated into polymeric systems such as, for example, polyurethane systems, to yield a polymer which is thermally stable and contains all of the desirable properties of the imide grouping as well as the urethane grouping. The prepolymers are prepared by reacting an excess of a polyisocyanate with a polycarboxylic acid having at least two pairs of vicinal carboxyl groups or an excess of the acid with a polyisocyanate. Should it be so desired, prepolymers may be prepared which act as chain stopper as more fully discussed hereinafter, in which case the tetracarboxylic acid would contain only a single pair of vicinal carboxylic acid groups and the isocyanate would be a polyisocyanate or the isocyanate would be a monoisocyanate and the acid would contain at least two pairs of vicinal carboxyl groups. A further advantage of this method for the preparation of polyimide is the facile copolymerization that can be achieved in a substantially one-shot system. For example, an excess of a polyisocyanate, a tetracarboxylic acid having the carboxyl groups in pairs in which the carboxyl groups are vicinal to one another an a polyol may be reacted in a one-shot system to yield a poly(urethane-imide)copolymer. On the other hand, an excess of the vicinal carboxylic acid groupings, polyisocyanate polyisocyanate and a compound containing groups reactive with carboxylic acid groups in addition to the polyisocyanate may be used. In fact, the process of the instant invention may be used in any system containing a third reactant capable of reacting with isocyanate groups or carboxylic acid groups, as well as in systems of polyblends. Thus it is possible to prepare poly(imide-esters) from the reaction of a polyisocyanate, an excess of a vicinal diacid and a glycol, triol, tetrol and the like; a poly(imide-amide) from a polyisocyanate, an excess of a vicinal diacid and an amine; a poly(imide-ester-amide) from a polyisocyanate, an excess of a vicinal diacid, a glycol and an amine; a poly(imide-amide) from a polyisocyanate and a compound containing at least one pair of vicinal carboxylic acid groups as well as other acid groups not vicinal to one another and a polyol; a poly(urea-imide) from an excess of polyisocyanate, a vicinal diacid and a diamine or polyamine; a poly(urethane-ester-imide) from a polyisocyanate, a vicinal diacid and an hydroxyl polyester; a poly(urea-imide) from a polyisocyanate, a vicinal diacid and water; a poly(thiourethane-imide) from a polyisocyanate, a vicinal diacid and a polythiol; a poly(ether-urethane-imide) from a polyisocyanate, a vicinal diacid and an hydroxyl polyether; a poly(amide-imide) from a polyisocyanate, a vicinal diacid and a dicarboxylic acid, and so on. The possible combinations feasible in preparing copolymers having the imide grouping therein according to the process of this invention are numerous. In addition to the foregoing combinations, the polyisocyanate and vicinal diacid may also be reacted with any and all compounds containing the N-H grouping including primary and secondary amines as well as ammonia, hydrazines, amino carboxylic acids, salts, especially sodium salts of aminosulfonic acids hydroxylamines, imides, amidines, nitramines, diazoamino compounds, phenylhydrazones, cyanamides, aminooximes, sulfimides, acylureas, thioureas, hydrazoic acids, isothioureas, and, at temperatures sufficiently low so that the carboxyl group does not react or other side reactions occur, the basic salts and esters of the amino acids.

The polyisocyanate and the vicinal diacid may also be reacted with an amide to yield a poly(acylurea-imide) copolymer. N-substituted amides may give the normal addition products although more vigorous reaction conditions may be used to produce a poly(amidine-imide) or a mixture thereof with poly(acylurea-imides), especially when the isocyanate is p-toluene sulfonyl iscoyanate; N,N-dialkylamides yield much the same type of product. Further, like he amides of carboxylic acids, sulfonamides will add to isocyanates to yield the corresponding product.

Ureas may be reacted with polyisocyanates and vicinal diacids to yield poly(biuret-imides) and urethanes may be similarly reacted to form poly(allophanate-imides).

Essentially all compounds containing a hydrogen atom attached to oxygen will react with a polyisocyanate and vicinal diacid to yield a copolymeric material, including alcohols such as, for example, alkane, alkene and alkyne diols, triols, tetrols and the like, phenols, polyesters, polyethers, polyacetals, castor oil, water, carboxylic acids, hydroxylamines, compounds which enolize such as $C_5H_6O_2$, benzohydroxamic acid, oximes, dioximes, hydroxamic acids, hydroperoxides, hydrogen peroxide, hydroxysilanes, compounds containing C—H bonds in which the hydrogen may readily be replaced by sodium including malonic esters, nitroalkanes, acetoacetic esters, acetylacetone and the like as well as methylene compounds containing two activating groups such as, for example, carbonyl, ester, nitrile, nitro; the a-position of pyrrole and the methylene group of N-alkyl-2-methylenedihydropyridine and related compounds which act similarly. Sulfur compounds react in a manner similar to their oxygen analogs and mercaptans, thiophenols, alkane, alkene, and alkyne thiols having two or more —SH groups, mercaptobenzothiazole, polyhydric polythioethers, hydrogen sulfide, and metal slats of hydrogen sulfide may be used to yield poly(thioures-imides), poly(thiourethane-imides) and the like.

Further, addition products of isocyanates and unsaturated compounds such as styrene, ethylene and the like in the reaction with vicinal diacids may also yield copolymers in accordance with this invention. The isocyanate may also be dimerized or trimerized with a suitable catalyst to yield a copolymeric isocyanurate-imide or uretidine dione-imide, and mixed dimers and trimers are also suitable in the preparation of the copolymer in accordance with this invention.

Therefore, any suitable compound containing active hydrogen atoms which are reactive with isocyanate groups may be used to prepare copolymers in a reaction with a polyisocyanate and a vicinal diacid within the scope of this invention. Such suitable compounds are, for example, the aliphatic polyols, hydroxyl polyesters, polyalkylene ethers with initiators, polyhydric polythioethers, polyester amides, polyacetals, thiols, polyamines and phosphorous containing compounds listed in U.S. Pat. No. 3,201,372. In addition, any silicone resins which contain free hydroxyl groups such as, for example,

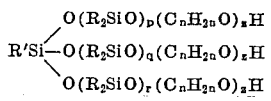

wherein R', R, p, q, r, n and z are as hereinafter defined, may also be used as polyhydroxy compounds as well as phenol-formaldehyde condensates. Addition products of alkylene oxides to ammonia, amines or hydrazines such as triethanolamine, triisopropanolamine and the like as well as polycarbonates having free hydroxyl groups may also be used.

Compounds containing secondary amino groups may also be used. Some such suitable compounds are, for example, diethylamine, dimethylamine, propylbutylamine, N-methyl aniline, N,N'-dimethyl-p-amino- aniline, N,N'-dibutyl-2,4-diamino toluene, hydrazines such as, for example, N,N'-dimethyl hydrazine, N,N'-dioctylhydrazine and the like.

Some useful compounds having predominately secondary hydroxyl groups which may also be used are castor oil, brominated or hydrogenated castor oil, reaction products of castor oil with polyhydric alcohols, octadene-9-diol-1, 12, polyether alcohols derived from propylene oxide and a polyhydric alcohol, an amine, hydrazine or ammonia, epoxy resins produced from polyhydric alcohols or phenols with epichlorohydrin in alkaline solution and the like and mixtures thereof.

Any suitable polycarboxylic acid may also be used such as those listed in U.S. Pat. No. 3,201,372 for the preparation of polyesters.

Any suitable amino acid may also be used such as, for example, carbamic acid, glycine, glycocol, alanine, leucine, isovaline, serine, methionine, thyroxine, aspartic acid, glutamic acid, arginine, lysine, citrulline, histidine, proline, hydroxylproline and the like as well as salts and esters of any of the foregoing.

Any suitable sulfonic acid as well as the salts thereof, particularly the sodium salt, may also be used. Some such suitable sulfonic acids are, for example, hydroxyl sulfonic acids such as 2-naphthol-8-sulfonic acid, amino sulfonic acids such as aniline sulfonic acids such as anilene-m-sulfonic acid, hydroxyamino sulfonic acids such as 2-amino-5-naphthol-7-sulfonic acid, disulfonic acids such as benzene-1,5-disulfonic acid, hydroxy-disulfonic acids such as phenol-3,5-disulfonic acid, amino disulfonic acids such as 1-napthylamine-4,7-disulfonic acid, dihydroxy disulfonic acids such as 1,4-dihydroxybenzene-3,5-disulfonic acid, amino hydroxy disulfonic acids such as 1-amino-8-naphthol-3, 6-disulfonic acid, trisulfonic acids such as 1-naphthylamine-3,6,8-trisulfonic acid and the like and the sodium and calcium salts of the foregoing.

In addition to the foregoing, more complex materials may also be used. For example, any suitable imides such as guanidine, amidines such as acetamidine, nitramine such as methylnitramine, diazoamines such as phenyltriazene, phenylhydrazones such as those formed by the reaction of phenylhydrazine on aldehydes and ketones such as benzaldehyde and acetone, cyanamides such as carbamic acid nitril, oximes, dioximes and amino oximes such as the condensation products of aldehydes such as benzaldehyde or ketones such as acetone with hydroxylamine, formaminooxime, and glyoxime, sulfimides such as methylsulfimide, acylureas such as acetylurea, thioureas such as thiocarbamide, hydrozoic acid, isothioureas such as isothiocarbamide, amides such as formamide, substituted amides such as methylformamide and N,N-dimethylformamide, sulfonamides such as methylsulfonamide, ureas such as carbamide, urethanes such as those prepared by the reaction between any isocyanate and any active hydrogen containing compound as mentioned herein, hydroxamic acid, phenol and phenols such as 3,5-dimethylphenol, benzohydroxamic acid, hydroperoxides, hydrogen peroxide and the like may also be used, as well as hydroxylamine, cyanamide, hydrazoic acid and the like.

Additional functional groups in the foregoing compounds or any other functional groups contained therein such as, for example, methoxy, ethoxy, propoxy, butoxy and the like, carboalkoxy groups such as, for example, carbomethoxy, carbethoxy and the like; dialkyl amino groups such as, for example, dimethyl amino, dipropyl amino, methylethyl amino and the like; mercapto, carbonyl, thiocarbonyl, phosphoryl, phosphato and the like groups may participate in the reaction to yield ever more mixed products with the polyisocyanate and vicinal diacid if desired. Monofunctional counterparts of any of the foregoing compounds may be used to control the molecular weight of the polymer being formed by acting as chain stoppers.

Any suitable isocyanate may be used and all isocyanates are contemplated. Some such suitable isocyanates are, for example, those listed in Canadian Pat. No. 698,638 as well as tetramethylendiisocyanate, hexamethylenediisocyanate, 1,4-phenylenediisocyanate, 1,3-phenylenediisocyanate, 1,4-cyclohexylenediisocyanate, 2,4-tolylenediisocyanate, 2,5-tolylenediisocyanate, 2,6-tolylenediisocyanate, 3,5-tolylenediisocyanate, 4-chloro-1,3-phenylenediisocyanate, 1-methoxy-2,4-phenylenediisocyanate, 1-methyl-3,5-diethyl-2,6 -phenylenediisocyanate, 1,3,5-triethyl-2,4-phenylenediisocyanate, 1-methyl-3,5-diethyl-2,4-phenylenediisocyanate, 1-methyl-3,5-diethyl-6-chloro-2,4-phenylenediisocyanate, 6-methyl-2,4-diethyl-5-nitro-1,3-phenylenediisocyanate, p-xylylevediisocyanate, m-xylylenediisocyanate, 4,6-dimethyl-1,3-xylylenediisocyanate, 1,3-dimethyl-4,6-bis-(b-isocyanatoethyl)-benzene, 3-(a-isocyanatoethyl)-phenylisocyanate, 1-methyl-2,4-cyclohexylenediisocyanate, 4,4'-biphenylenediisocyanate, 3,3'-dimethyl-4,4'-biphenylenediisocyanate, 3,3'-dimethoxy-4,4'-biphenylenediisocyanate, 3,3'-diethoxy-4,4'-biphenylenediisocyanate, 1,1'-bis-(4-isocyanatophenyl)cyclohexane, 4,4'-diisocyanato-diphenylether, 4,4'-diisocyanato-dicyclohexylmethane, 4,4'-diisocyanato-diphenylmethane, 4,4'-diisocyanato-3,3'-dimethyldiphenylmethane, 4,4'-diisocyanato-3,3'-dichlorodiphenylmethane, 4,4'-diisocyanato-diphenyldimethylmethane, 1,5-naphthylenediisocyanate, 1,4-naphthylenediisocyanate, 4,4',4''-triisocyanatotriphenylmethane, 2,4,4'-triisocyanate-diphenylether, 2,4,6-triisocyanato 1-methyl-3,5-diethylbenzene, o-tolidine-4,4'-diisocyanate, m-tolidine-4,4'-diisocyanate, benzophenone-4,4'-diisocyanate, biuret triisocyanates of any of the foregoing such as, for example, from 3 mols hexamethylene diisocyanate and 1 mol water; carbodiimides with free terminal NCO groups, for example, from polyisocyanates with catalysts such as phosphine oxides; dimers and trimers of any of the foregoing isocyanates having free NCO groups; prepolymers prepared from any of the foregoing having terminal NCO groups; the hydrogenated form of any of the foregoing unsaturated isocyanates and particularly hydrogenated tolylene diisocyanate and hydrogenated 4,4'-diphenylmethane diisocyanate, the corresponding thiocyanates of any of the foregoing and mixtures thereof and the like. The monoisocyanates may be used to control the molecular weight of the polymer being formed by acting as chain stoppers.

Any suitable mixture of the aforementioned isocyanates as well as unrefined or crude isocyanates may also be used. For example, crude toluylene diisocyanates can be obtained by the phosgenation of a mixture of toluylene diamines, and crude diphenylmethane isocyanates can be obtained by the phosgenation of crude diphenylmethane diamine which is the reaction product of aniline and formaldehyde in the presence of HCl. Such polyisocyanates are generally mixtures of organic polyisocyanates having the generic formula:

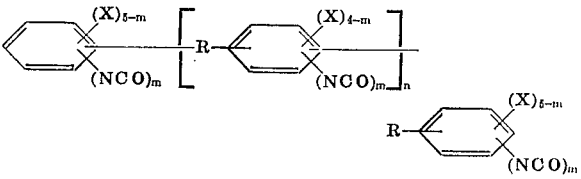

in which R is an organic radical and preferably an aliphatic radical obtained by removing the carbonyl oxygen from an aldehyde or ketone and is preferably —CH$_2$—, $m$ is 1 or 2, X is halogen, lower alkyl or hydrogen and $n$ is 0, 1, 2 or 3. The aliphatic radical, R, in the foregoing formula may be obtained by removing the carbonyl oxygen from any suitable aldehyde or ketone such as formaldehyde, acetaldehyde, propionaldehyde, butyraldehyde, N-heptaldehyde, benzaldehyde, cyclohexane aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. To illustrate, if one removes the carbonyl oxygen from formaldehyde, H$_2$C=O, the radical remaining is

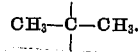

When X is halogen, it may be any suitable halogen but is preferably chlorine or bromine and further, it is preferred that the amount of chlorine or bromine fall between about one percent and fifteen percent by weight of the compound. When X is lower alkyl, it is most preferably methyl or ethyl but other lower alkyl radicals such as propyl, butyl and the like may be the radical X. The polyaryl alkylene polyisocyanates of the invention are preferably mixtures of di- and higher poly-isocyanates. Thus, $n$ in the formula preferably has a value of from about 0.1 to about 1.5. To illustrate, in a mixture of isocyanates of the above formula containing 90 percent diisocyanate and 10 percent triisocyanate, $n$ would have a value of 0.1. For a mixture containing 20 percent di-, 30 percent tri-, 30 percent tetra- and 20 percent penta-isocyanate, the average value of $n$ would be 1.5. A most preferred value for $n$ is between about 0.85 and about 1.1 with about 40 percent to about 60 percent of the mixture of polyisocyanates being a diisocyanate.

Isocyanates of the above formula are well-known and available commercially. They may be prepared as disclosed in U.S. Pat. No. 2,683,730. A specific isocyanate suitable for use in accordance with the present invention may be obtained by reacting about 60 parts of aniline with about 25 parts of formaldehyde (aqueous, 37 percent CH$_2$O) and about 74 parts of HCl (aqueous, 30 percent HCl) at a temperature of about 90° C. to about 100° C. for about 1.5 to about 2 hours and then reacting this product with NaOH and separating out the crude amine. About 100 parts of phosgene are then reacted with the resulting amine until a product having an amine equivalent of about 135 and containing about 31 percent free —NCO is obtained. The free excess phosgene and substantially all of the solvents used, if any, are then removed. The best products have 40 percent to 60 percent 4,4'-diphenylmethane diisocyanate, an amine equivalent of about 125 to about 140, about 0.04 to about 0.4 percent by weight hydrolyzable chloride, about 0.1 to about 0.6 percent by weight total chloride and having a flash point of above about 400° F. When tolylene diisocyanates, for example, are produced by conventional phosgenation of the corresponding diamines, a product containing about 90 percent 2,4- and 2,6-tolylene diisocyanate and the balance a crude residue of imidazoles and the like resulting in the phosgenation is obtained from the phosgenator. This product may also be used. It is preferred to phosgenate a mixture of ortho- and para-tolylene diamines. A specific product is the undistilled reaction mixture obtained by the phosgenation of 80 percent 2,4-tolylene diisocyanate and 20 percent 2,6-tolylene diisocyanate and the balance polymers incapable of accurate analysis.

The molecular weight of the imide of this invention may be controlled by the addition of dicarboxylic acids which contain their acid groups ortho to one another and hence act as chain stoppers. Any suitable dicarboxylic acids may be used for this purpose, such as, for example, the dicarboxylic acid counterpart of any of the polycarboxylic acids listed herein including those acids derived from one mol of a compound containing only one group which will oxidize to yield a carboxylic acid group or no groups which will oxidize to yield a carboxylic acid group and one mol of a compound which contains a grouping or groupings capable of oxidizing to yield one pair of vicinal carboxylic acid groups.

In the practice of this invention, the anhydride precursor of any of the polycarboxylic acids listed may also be used if there is a small amount of water present to act as an initiator or if they are first hydrolyzed to the corresponding acid before the formation of the imide begins.

The reaction may be carried out in any suitable solvent or solvent system in which the components of the reaction are soluble. Therefore, the solvent may be a strongly polar solvent such as, for example, any of the cyclic sulfones and sulfoxides, N-methyl pyrolidone, dimethyl sulfoxide, tetramethylene sulfone, dimethylacetamide, dimethylformamide; or a mixed solvent system of a strong polar solvent such as any of the foregoing and another solvent such as, for example, methylene chloride, o-dichlorobenzene, xylene, toluene, cresol, acetone, ethyl acetate, dioxane, ethylene glycol, monoethyl ether acetate and the like. Preferably, the strongly polar solvents are used; however, if all of the components of the reaction mixture are soluble in non-polar solvents, then the reaction may be carried out without the inclusion of a strongly polar solvent. Even further, the reaction may be carried out without a solvent if a solid state reaction will take place or the reactants are soluble in one another. It is to be noted, however, that the solvent may play an important part in the rate of the reaction making the use of a solvent most advantageous. In particular, solvents such as dimethylsulfoxide, dimethylacetamide and dimethylformamide are most preferred for their positive effect on the reaction rate.

Polyimides may also be used in polyblends to impart increased thermal resistance to other polymers. Any suitable polymer may be blended with the polyimides of this invention and all are contemplated including ethylenic polymers, polyurethanes, polyesters, polyethers, polysulfones, polysulfonates, polyamides, polycarbonates, polyureas and so on. Some such polymers are described in U.S. Pat. Nos. 2,948,691; 3,028,365; 3,236,808; 3,236,809; 3,245,947; 3,048,564; 3,049,518; 3,057,826; 3,063,966; 3,178,402; 3,112,300; and C and E News, Apr. 12, 1965, p. 28.

As a result of the process of this invention, imides and copolymers containing imide linkages may be prepared directly in one-shot systems to yield foams, elastomers, films, fibers coatings, enamels, lacquers and the like or else, the imides, the imide-containing prepolymers and the copolymers and polyblends prepared according to the process of this invention may be used in further reactions to prepare any desired end product. The isocyanate terminated prepolymer may be reacted with any suitable compound containing reactive hydrogen atoms which are reactive with NCO groups as set forth herein to prepare a polyurethane containing imide groups, for example, as well as other types of polymers and copolymers. On the other hand, if the prepolymeric material contains terminal carboxylic acid groups or any other groups which are reactive with other compounds such as isocyanates, for example, a polyisocyanate may be reacted with it in order to prepare a pure polyimide or an imide-containing polyurethane product and the like, and so on. Thus a polyurethane elastomer may be prepared by reacting the NCO terminated reaction product described with an active hydrogen containing compound, if desired, in the presence of a chain extending agent such as, for example, any of the diols and triols listed herein.

Cellular polyurethanes, particularly rigid cellular polyurethane materials having great stability to high temperatures may also be prepared by carrying out the described reaction in the presence of a blowing agent. Suitable processes for the preparation of cellular polyurethane plastics are disclosed in U.S. Pat. Re. 24,514 together with a suitable apparatus for mixing the components. When water is added as the blowing agent, corresponding quantities of excess NCO-terminated prepolymer to react with the water and produce carbon dioxide should be used. Instead of water, however, low boiling hydrocarbons such as pentane, hexane, heptane, pentene, heptene and the like, halogenated hydrocarbons such as dichlorodifluoromethane, dichlorodifluoroethane, trichlorofluoromethane, vinylidene chloride, methylene chloride and the like or mixtures thereof, azo compounds such as azohexahydrobenzodinitrile and the like may be used as blowing agents.

A prepolymer prepared in accordance with this invention may also be used in the production of coating compositions by carrying out the NCO-active hydrogen reaction in any suitable inert organic solvent therefor, such as, for example, ethyl acetate, methyl formamide, the diethyl ether of diethylene glycol, benzene, xylene, benzine and the like.

In the preparation of the polyurethane, any suitable catalyst such as, for example, stannous chloride, a stannous salt of a carboxylic acid having from 1 to 18 carbon atoms, a trialkyl tin oxide, a dialkyl tin chloride, a dialkyl tin oxide or a dialkyl tin salt of a carboxylic acid having from 1 to 18 carbon atoms and the like may be used. These catalysts may be used alone or in combination with any other suitable catalytic compound, preferably a tertiary amine, such as, for example, triethylene diamine, $N,N,N',N'$-tetramethyl butylene diamine, a 1-alkyl-4(dialkylaminoalkylene) piperazine in which the alkyl radicals have from one to four carbon atoms and the alkylene radical has from 2 to 4 carbon atoms such as is described in U.S. Pat. No. 3,234,153, N-ethyl morpholine, or any of those which are disclosed in U.S. Pat. Nos. 2,948,928; 2,941,967 and 2,948,691 and the like.

It is often advantageous, and indeed preferably in those instances where the hereindescribed catalysts are employed, to include other additives in the reaction mixture, such as stabilizers, emulsifiers, coloring agents and fillers and the like, for example.

It is particularly advantageous to employ an emulsifier such as, for example, sulfonated castor oil and/or a foam stabilizer such as a silicone oil, for example, a polydimethyl siloxane or an alkyl silane polyoxyalkylene block copolymer. The latter type of silicone oil is disclosed in U.S. Pat. No. 2,834,748. Where polyhydric polyalkylene ethers are included in the reaction mixture to prepare a cellular polyurethane plastic, it is preferred to employ a silicone oil of the above patent within the scope of the formula

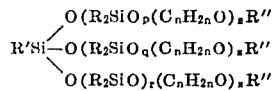

wherein R, R' and R'' are alkyl radicals having one to four carbon atoms; $p$, $q$ and $r$ each have a value of from 4 to 8 and $(C_nH_{2n}O)Bz$ is a mixed polyoxyethylene oxypropylene group containing from 15 to 19 oxyethylene units and from 11 to 15 oxypropylene units with z equal to from about 26 to about 34.

In a modification of the above formula, R' and R'', in addition to being an alkyl radical having from one to four carbon atoms, may be hydrogen atoms, or hydroxyl-containing alkyl radicals having from one to four carbon atoms. A preferred compound, however, has the formula

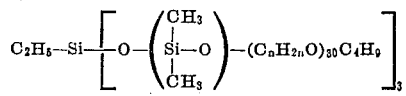

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Pat. Nos. 668,537, 668,478 and 670,091.

In addition, any other type of polymeric material including polyurethanes may be modified by the incorporation of the imides, prepolymers, copolymers or polyblends of this invention including polyesters, polyolefines, polycarbonates and the like. Such modification imparts a high degree of thermal stability to such materials, thus increasing the range of applications to which they may be put. Further, the products of the process of this invention may be present merely as a filler or modifier, or they may be reacted into the polymeric chain or used as chain stoppers for polymeric materials such as polyurethanes, polyesters and the like, if desired; in any case they will result in an increase in thermal stability to the product.

Even further, the imides or copolymeric products of the process of this invention may be used directly as produced in a solvent as lacquers which are resistant to high temperature such as, for example, for wire enamels, or for the production of films and foils resistant to high temperatures. They may also be used in admixture with other conventional raw materials used in the production of lacquers, films, foils and the like such as, for example, terephthalic acid polyesters in the manufacture of wire lacquers. The lacquers, films or foils and the like obtained in this manner are distinguished from their known counterparts by their very high resistance to heat and their toughness or high tensile strength.

In addition to their use in the preparation of imides, the unique sulfonyl acids and anhydrides of this invention are suitable for the preparation of polyesters by simply reacting them with any suitable alcohol or polyol such as those listed herein and in U.S. Pat. No. 3,201,372, as well as any other suitable OH containing compound. The anhydrides may first by hydrolyzed and then esterified or else the anhydride itself may be reacted with a suitable active hydrogen containing compound. Any of the acids and anhydrides described herein may be reacted with any of the OH containing compounds listed herein or in U.S. Pat. No. 3,201,372 or any other suitable OH containing compound to prepare a suitable ester or polyester as desired. The polyesters thus prepared from the unique acids and anhydrides of this invention may then be employed for any use in which polyesters are suitable and may be used, for example, in the preparation of higher polymeric materials such as polyurethane foams, elastomers, coatings and lacquers and the like to be ultimately employed in the preparation of cushions, gears, paints and varnishes and the like.

Further, the unique acids and anhydrides listed herein are eminently suitable in the curing of epoxy resins, and may be used in any such systems as desired. Particularly, the unique acids and anhydrides of this invention are significant in the curing of epoxides as described in *Preparative Methods of Polymer Chemistry*, 1961, published by Interscience Publishers, Inc. Even more specifically, the unique acids and anhydrides of this invention are suitable in the practice of the methods set out in chapter 7 of *Preparative Methods of Polymer Chemistry* wherein synthetic resins are discussed. The epoxide resins fabricated with the unique acids and anhydrides of this invention may then be employed in any suitable application in which epoxides are suited. For example, they may be used as lacquers and adhesives and the like.

The invention is further illustrated but not limited by the following examples in which all parts and percentages are by weight unless otherwise specified.

EXAMPLE 1

About 106 parts (1 mol) of o-xylene is refluxed with about 133 parts (1 mol) of chlorosulfonic acid for about 6 hours. The reaction mixture is then cooled and poured on ice. The di-3,4-xylyl sulfone obtained is collected by filtration and the aqueous filtrate is extracted with three consecutive 100 ml. aliquots of chloroform. The chloroform extracts are combined with the filtered solid and the chloroform is evaporated. The residual solid is recrystallized from methanol. The infrared and elemental analyses confirm the di-o-xylyl-sulfone formation.

About 10 parts of the di-3,4-xylyl sulfone are oxidized by refluxing with dilute nitric acid to yield the corresponding diphenylsufone tetracarboxylic acid. The acid is then converted to the dianhydride by heating it at about 220° C.

EXAMPLE 2

The di-o-xylyl-sulfone of example 1 is heated with concentrated nitric acid to yield the nitrated diphenylsulfone tetracarboxylic acid. The acid is converted to the corresponding dianhydride by heating it at about 220° C.

EXAMPLE 3

About 1 mol of naphthalene is heated to about 150° C. for about 16 hours with about 1 mol of 30 percent oleum and 1 mol of chlorosulfonic acid. The dinaphthylsulfone formed is isolated by pouring the reaction mixture slowly into water and filtering the product. The dinaphthylsulfone is then recrystallized from a petroleum ether-methanol mixture and the recrystallized product is oxidized to diphenylsulfone tetracarboxylic acid at about 400° C. with air over a vanadium pentoxide catalyst.

EXAMPLE 4

The di-o-xylylsulfone of example 1 is oxidized to diphenylsulfone tetracarboxylic acid by oxidation at about 450° C. with air over vanadium pentoxide.

EXAMPLE 5

About 1 mol of o-xylene is mixed with about 0.5 mols of sulfuryl chloride ($SO_2Cl_2$) in about 500 ml. of nitrobenzene. The reaction mixture is stirred and about 1 mol of anhydrous aluminum chloride is slowly added over about 3 hours. The reaction mixture is filtered, refluxed for about 2 hours and poured into about 1 liter of isopropanol. The di-3,4-xylylsulfone precipitates and is converted to the corresponding tetracarboxylic acid and/or dianhydride by treating it with either dilute nitric acid or air over vanadium pentoxide.

EXAMPLE 6

About 1 mol of phthalic anhydride is heated with about 6 mols of chlorosulfonic acid at about 150° C. for about 16 hours with stirring. The reaction mixture is poured over ice and the precipitated product is isolated by filtration. The diphenylsulfone dianhydride is separated from any unreacted phthalic anhydride by washing the filtered product with a hot mixture of benzene and petroleum ether or by sublimation of the phthalic anhydride.

EXAMPLE 7

The diphenylsulfone tetracarboxylic acid prepared in example 3 is converted to the corresponding anhydride by refluxing about 1 mol of the tetracarboxylic acid with an excess of acetic anhydride and distilling off the resultant acetic acid and excess acetic anhydride. The product obtained is diphenylsulfone dianhydride as the residue.

EXAMPLE 8

About 10 parts of di-2,3-xylyl sulfide or di-3,4-xylyl sulfide are oxidized with an alkaline solution of excess permanganate by refluxing for about 24 hours. The solution is then refluxed with an excess of ethanol for an additional half hour. The reaction mixture is then filtered and the corresponding di-o-xylylsulfone is isolated by washing the solid deposited on the filter with hot methanol. The methanol solution is then cooled and filtered to obtain a pure product of the corresponding di-o-xylylsulfone.

The di-o-xylylsulfone obtained is converted to the corresponding diphenylsulfone tetracarboxylic acid and/or anhydride by the process described in examples 1 or 4.

EXAMPLE 9

About 1 mol of o-xylene and about 1 mol of toluene are mixed with about 2 mols of chlorosulfonic acid and the mixture is refluxed for about 12 hours. The reaction mixture is then cooled and poured over ice. The crude mixture of sulfones which forms in the reaction is then filtered and the ditolysulfone, tolyl-o-xylylsulfone and di-o-xylylsulfone are isolated by fractional distillation at reduced pressures.

The tolyl-o-xylylsulfone is oxidized to the corresponding carboxyphenyl-o-dicarboxyphenylsulfone by heating it with dilute nitric acid under reflux for about 24 hours according to the equation:

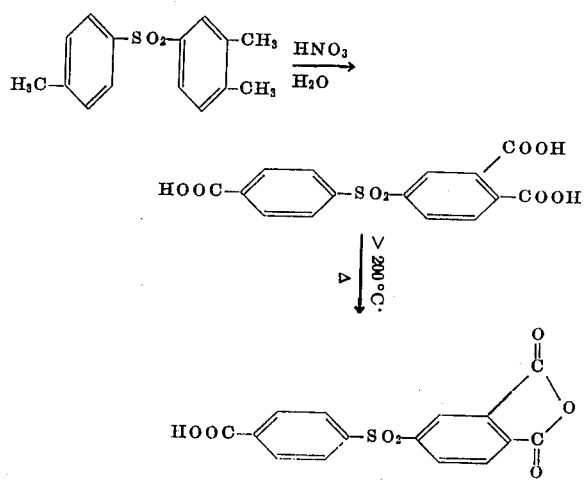

The anhydride is produced from the o-dicarboxylic acid by heating it at above 200° C. and yields amide-imide type polymers from diamines or diisocyanates in the process of this invention for the preparation of imides.

The di-o-xylylsufone is treated as in example 1.

EXAMPLE 10

About 1 mol of bis-(3,4-dicarboxyphenyl) sulfone is reacted with about 4 mols of butanol in about one liter of xylene. The water which forms in the esterification reaction is azeotropically distilled and the resultant ester is reacted with about 1 mol of ethylene glycol. A polyester having a molecular weight of about 40,000 is formed and is of the type:

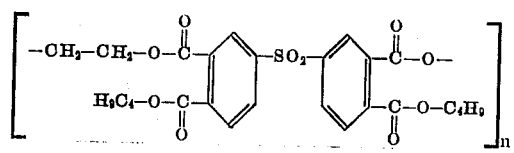

EXAMPLE 11

About 50 parts of a resin having the structure:

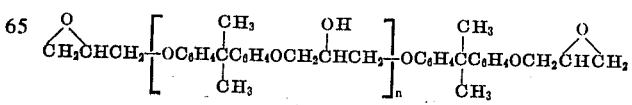

are heated to about 120° C. in an oil bath. About 15 parts of the anhydride prepared in example 1 in molten form are added and stirred into the resin, and the mixture is heated to about 120° C. for about 1 hour. The product is then heated for about 1 to 2 hours at about 170°–180° C. to effect the final cure. A clear, hard, insoluble resin is obtained.

If about 0.5 part of N,N'-dimethylaniline is added to the reaction mixture immediately after or along with the anhydride, the resin will cure in about 1 hour at about 120° C. Tertiary amines function as accelerators for the anhydride curing of epoxy resins.

EXAMPLE 12

About 134 parts (1 mol) of durene are refluxed with about 133 parts (1 mol) of chlorosuflonic acid for about 6 hours. The reaction mixture is then cooled and poured on ice. The didurenesulfone obtained is collected by filtration and the aqueous filtrate is extracted with three consecutive 100 ml. aliquot portions of chloroform. The chloroform extracts are combined with the filtered solid and the chloroform is evaporated. The residual solid is recrystallized from methanol. The infrared and elemental analyses confirm the formation of the didurenesulfone.

About 10 parts of the sulfone are then oxidized by refluxing with dilute nitric acid to yield diphenylsulfone octacarboxylic acid. The acid is then converted to the corresponding anhydride by heating it at about 220° C.

EXAMPLE 13

About 40 parts of di(3,4-dicarboxyphenyl)sulfone are dissolved in about 200 ml. of freshly distilled dimethylacetamide with gentle warming. The resulting solution is mixed with a solution of about 25 parts of 4,4'-diphenylmethane diisocyanate in about 200 ml. of dimethylacetamide. The solution obtained is clear and slightly yellow.

An IR spectrum gives a characteristic imide peak at 5.6 microns and at 3.8 microns.

EXAMPLE 14

About 60 parts of the di(2,3,5,6-tetracarboxyphenyl)sulfone prepared in example 12 are dissolved in about 200 ml. of dimethylacetamide with slight warming and stirring. A solution of about 25 parts of 4,4'- diphenylmethane diisocyanate in about 200 ml. of dimethylacetamide is added to the pyromellitic acid solution with stirring. The evolution of bubbles occurs and the solution becomes dark amber in color while remaining transparent. The infrared spectrum of a film of the reaction product shows sharp and pronounced bands at 5.63µ and 13.85µ thus showing that the imide is present in the dimethylacetamide soluble polymer.

EXAMPLE 15

The same reaction as set forth in example 14 is carried out using dimethylsulfoxide as the solvent. More vehement foaming and bubble propagation takes place and the product is obtained in solution that is pale yellow. A film prepared from the product solution has a deeper brown color than one prepared from the dimethylsulfoxide solution of the same product. Infrared spectra shows that the product of example 14 is essentially identical to that produced in dimethylacetamide.

EXAMPLE 16

About 360 parts of the corresponding anhydride of di-(3,4-dicarboxyphenyl)sulfone are permitted to react with about 36 parts of water to form the corresponding vicinal diacid product. The vicinal diacid is then stirred into about 200 ml. of dimethylformamide. About 348 parts of tolylene diisocyanate are dissolved in about 200 ml. of methylene chloride and mixed with the vicinal diacid solution. Reaction occurs instantaneously without the addition of heat, pressure, catalysis or the like. A transparent pale yellow solution is formed which yields a light brown or tan film having extraordinary thermal stability when applied to a glass surface. The infrared spectrum of the resulting film shows sharp and pronounced peaks at 5.63µ and 13.85µ definitely indicating the formation of the imide linkages. About 480 parts of the imide product having terminal NCO groups are then reacted with about 2,000 parts of a polyalkylene ether glycol having a molecular weight of about 3000 and an hydroxyl number of about 45 in the presence of trichlorofluoromethane to yield a low-density rigid cellular polyurethane foam having a high degree of thermal stability.

EXAMPLE 17

About 500 parts of di-(6,7-dicarboxynaphthyl)sulfone and about 260 parts of hexamethylene diisocyanate are dissolved in about 600 ml. of dimethylformamide. Reaction takes place and the resulting solution of the carboxyl-terminated polymer is transparent. About 760 parts of the carboxyl terminated imide product are then reacted with about 350 parts of toluylene diisocyanate and about 90 parts of 1,4-butanediol to form a polyurethane millable gum which is then cured to yield a polyurethane elastomeric product having a high degree of thermal stability.

EXAMPLE 18

About 400 parts of di-(3,4-dicarboxylphenyl)sulfone, about 360 parts of hydrogenated tolylene diisocyanate and about 1,300 parts of a polyester prepared from adipic acid and ethylene glycol and having a molecular weight of about 1,300 and an hydroxyl number of about 43 are added to about 1,000 ml. of dimethylsulfoxide and stirred. A tough, elastomeric coating of poly(urethane-imide) is formed upon evaporation of the solvent.

EXAMPLE 19

About 360 parts of

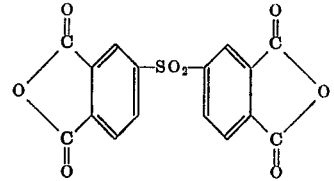

are hydrolyzed to the corresponding acid and added with about 390 parts of a mixture of an isocyanate having the formula

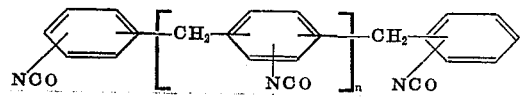

wherein n has an average value of about 0.88 to about 1,400 ml. of dimethylsulfoxide; the reaction begins immediately. The solution thus formed is highly viscous and can be used as a thermally stable coating for steel wires.

EXAMPLE 20

About 394 parts of 3,3',4,4'-diphenylsulfone tetracarboxylic acid, about 192 parts of tolylene diisocyanate (80:20) and about 33 parts of phthalic acid are dissolved in dimethylacetamide and allowed to react. A short chain polymeric imide is formed due to the action of the phthalic acid as a chain stopper. The solution of the polymer obtained is transparent and slightly yellow.

EXAMPLE 21

About 440 parts of (p-carboxyphenyl-3,4-dicarboxyphenyl)-sulfone instead of 3,3',4,4'-diphenylsulfone tetracarboxylic acid and about 192 parts of tolylene diisocyanate (80:20) are dissolved in dimethylacetamide and allowed to react. A short chain polymeric imide is formed due to the action of the phthalic acid as a chain stopper. The solution of the polymer obtained is transparent and slightly yellow.

EXAMPLE 22

To about 174 parts of tolylene diisocyanate are added with stirring about 40 parts of di(3,4-dicarboxyphenyl)sulfone. A reaction occurs with the evolution of $CO_2$ and a viscous reaction mass of prepolymeric imide-isocyanate is formed. The prepolymeric imide-isocyanate is then reacted at melt temperature with about 1,600 parts of a polyester prepared by the reaction between diethylene glycol and adipic acid and having a molecular weight of about 2,000 to form a thermoplastic poly(imide-urethane).

EXAMPLE 23

To about 50 parts of a polyimide formed from about 250 parts of 4,4'-diphenylmethane diisocyanate and about 400 parts of di-(3,4-dicarboxyphenyl)sulfone are added to about 50 parts of a 2,2-(4,4'-dihydroxydiphenl)propane polycarbonate resin. The composite polyblend material has an increased thermal resistance over that of the native polycarbonate.

EXAMPLE 24

About 40 parts of di-(3,4-di-carboxyphenyl)sulfone are dissolved in about 400 parts dimethyl acetamide. To this solution are added about 120 parts of phenyl isocyanate. After stirring and heating, the solvent is evaporated and a thermoplastic imide polymer is formed which demonstrates exceptional thermal properties.

Although the preferred acids and anhydrides of this invention are those corresponding to di-(3,4-dicarboxyphenyl)sulfone, di(2,3-dicarboxyphenyl)sulfone, tetracarboxydinaphthyl sulfones, carboxyphenyl-o-dicarboxyphenyl sulfones, di(tetracarboxyphenyl)sulfones and the like, it is to be understood that any of the acids and anhydrides discussed herein may be employed as directed herein in the foregoing examples and that any of the components and conditions mentioned as suitable herein can be substituted for its counterpart in the foregoing examples. Hence, although the invention has been described in considerable detail in the foregoing, such detail is solely for the purpose of illustration and variations may be made by those skilled in the art without departing from the spirit and scope of the invention.

What is claimed is:

1. A process for the preparation of an imide which comprises reacting an organic isocyanate with a diaryl sulfone having at least two carboxylic acid groups attached to at least one of the aryl groups in the ortho position to one another.

2. The process of claim 1 wherein the organic isocyanate is a polyisocyanate.

3. A process for the preparation of a copolymer containing imide linkages which comprises reacting an NCO-terminated prepolymer prepared by the process of claim 1 with an organic compound containing at least two groups which are relative with NCO groups.

4. A process for the preparation of an imide which comprises the reaction in the absence of anhydride of an organic isocyanate with a diaryl sulfone having at least one pair of vicinal carboxylic acid groups attached to at least one of the aryl radical wherein one isocyanate group reacts with each pair of vicinal carboxylic acid groups to form an imide linkage.

5. A process for the preparation of an imide which comprises reacting an excess of an organic polyisocyanate with a diaryl sulfone containing at least two pairs of vicinal carboxylic acid groups in a reaction mixture containing a second compound containing groups which are reactive with NCO groups.

6. A process for the preparation of an imide which comprises reacting an organic polyisocyanate with an excess of a diaryl sulfone containing at least two pairs of vicinal carboxylic acid groups in a reaction mixture containing a second compound capable of reacting with carboxylic acid groups.

7. The process of claim 6 wherein the reaction mixture contains a blowing agent and a foam is formed.

8. The process of claim 6 wherein an elastomeric product is prepared.

9. The process of claim 6 wherein the reaction is carried out in a solvent.

* * * * *